(12) United States Patent
Corbett

(10) Patent No.: US 6,390,512 B1
(45) Date of Patent: May 21, 2002

(54) GASKET RETAINER CLIP

(75) Inventor: Kevin Corbett, Bristol (GB)

(73) Assignee: General Components, Inc., Gaithersburg, MD (US)

( * ) Notice: Subject to any disclaimer, the term of this patent is extended or adjusted under 35 U.S.C. 154(b) by 0 days.

(21) Appl. No.: 09/570,380

(22) Filed: May 12, 2000

(51) Int. Cl.[7] .......................... F16L 17/00; F16L 19/00
(52) U.S. Cl. .................. 285/379; 285/328; 285/917; 24/339
(58) Field of Search ................. 285/328, 379, 285/917; 24/329, 335, 336, 339

(56) References Cited

U.S. PATENT DOCUMENTS

| 5,681,064 A | * | 10/1997 | Aldridge et al. | ............ 285/379 |
| 6,145,888 A | * | 11/2000 | Ohmi et al. | ................. 285/379 |
| 6,170,890 B1 | * | 1/2001 | Ohmi et al. | ................. 285/379 |

FOREIGN PATENT DOCUMENTS

| GB | 143018 | * | 5/1920 | ................. 24/339 |
| GB | 254858 | * | 7/1926 | ................. 24/339 |

* cited by examiner

*Primary Examiner*—Neill Wilson
(74) *Attorney, Agent, or Firm*—Venable; John P. Shannon; Chad C. Anderson

(57) ABSTRACT

A retainer clip for holding a gasket between the ends of two coupling components includes a first resilient annular member extending circumferentially about two-thirds of a circle, a second resilient annular member having circumferential ends and a discontinuity between the ends, and a bridge connecting the first and second resilient annular members. The bridge has a circumferential extent of less than 45°, and the first resilient annular member is circumferentially expandable without causing the second resilient annular member to expand.

20 Claims, 2 Drawing Sheets

GASKET RETAINER CLIP

The present invention relates to a retainer clip for holding a gasket centered between the sealing beads of tube ends in a face seal fitting.

BACKGROUND OF THE INVENTION

Retainer clips for holding a gasket between sealing beads projecting from the ends of tubes in a face seal fitting are known. Such fittings include the type used in applications requiring special cleanliness, such as the manufacture of semiconductor devices. U.S. Pat. No. 4,838,583 to Babuder et al. discloses one such retainer clip. That retainer clip comprises a single annular structure which fits around the gasket and around one of the tube ends in a face seal fitting. A problem with the known retainer clips is that the gaskets expand during tightening of the assembly and retain their expanded condition during disassembly. The expansion of the gaskets causes similar expansion of the portion of the retainer clip around the gasket. That expansion is transferred from the portion of the clip around the gasket to the portion of the clip around the end of the tube, with the result that the portion around the tube expands, and then falls off when the fitting is disassembled. In addition, it has been necessary when changing a gasket to move the ends of the tubes farther apart than is optimum in order to move the old gasket axially beyond an end of the clip before moving the gasket transversely, that is, radially, out of the fitting.

SUMMARY OF THE INVENTION

By the present invention, the falling of the retainer clip from one of the tube ends or other coupling component during disassembly is avoided by preventing expansion of the portion of the retainer clip which fits around the tube end or other coupling component. In addition, the coupling components need be separated only a minimal amount to permit the changing of a gasket with the retainer clip of the present invention, because the retainer clip and the old gasket can be removed from the coupling component, and a new gasket inserted into the retainer clip and the retainer clip reattached to the coupling component, from the side, without the need for any axial movement.

The retainer clip according to the present invention accomplishes the advantages described above by avoiding the transfer of the expanding force of the gasket from the portion of the retainer clip holding the gasket to the portion of the clip fitting around the coupling component. Furthermore, a side opening in the portion of the clip fixed to the coupling component is sufficiently large to enable the clip to be removed from the coupling component from the side and repositioned on the coupling component from the side.

The retainer clip comprises two generally annular resilient elements which are coaxial with and spaced from one another while being connected by a bridge. One of the resilient annular members fits around the outer wall of the gasket, and the other resilient annular member fits around and clampingly engages the outer wall of the tube end or other coupling component. In one embodiment, the resilient annular member for the gasket has a circumferential extent of substantially a full circle, whereas the resilient annular member for the coupling component has a circumferential extent of approximately two-thirds of a circle. The use of the two connected but axially spaced annular members to fit, respectively, around the gasket and around the coupling component enables the two resilient annular members to act independently of one another and, therefore, to remain secured to two parts of different diameters. As a result of the retainer clip construction, each resilient annular member remains fixed to its respective component part through varying temperature ranges and irrespective of differences in dimensions of the gasket and the coupling components. The retainer clip is maintained in position on the gasket and on the coupling component by friction as a result of the use of a resilient material, for example, spring steel, for the retainer clip. The retainer clip of the invention overcomes the problem of retaining the gasket even though the gasket expands during tightening of the fitting. With face seal fittings using prior retainer clips, when the gasket expands, expansion is transferred to the retainer clip which then spreads and falls off of the coupling or gland component during disassembly.

The ends of the resilient annular member for clampingly engaging the coupling component can be spread apart sufficiently to permit the retainer clip and the gasket to be removed radially from the coupling component and for a retainer clip and new gasket to be inserted radially for installation. The retainer clip of the present invention, in addition to allowing the retainer clip and the gasket to be side-loaded, reduces by one-half the minimum clearance required to remove and replace a gasket.

The retainer clip of the invention is applicable to face seal fittings and gaskets like those shown in U.S. Pat. Nos. 4,838,583 to Babuder et al, 4,854,597 to Leigh, and 5,222,147 to McGarvey to hold the gasket in position before sealing beads on the coupling components engage the gasket.

DETAILED DESCRIPTION OF THE PREFERRED EMBODIMENTS

Figure 1:
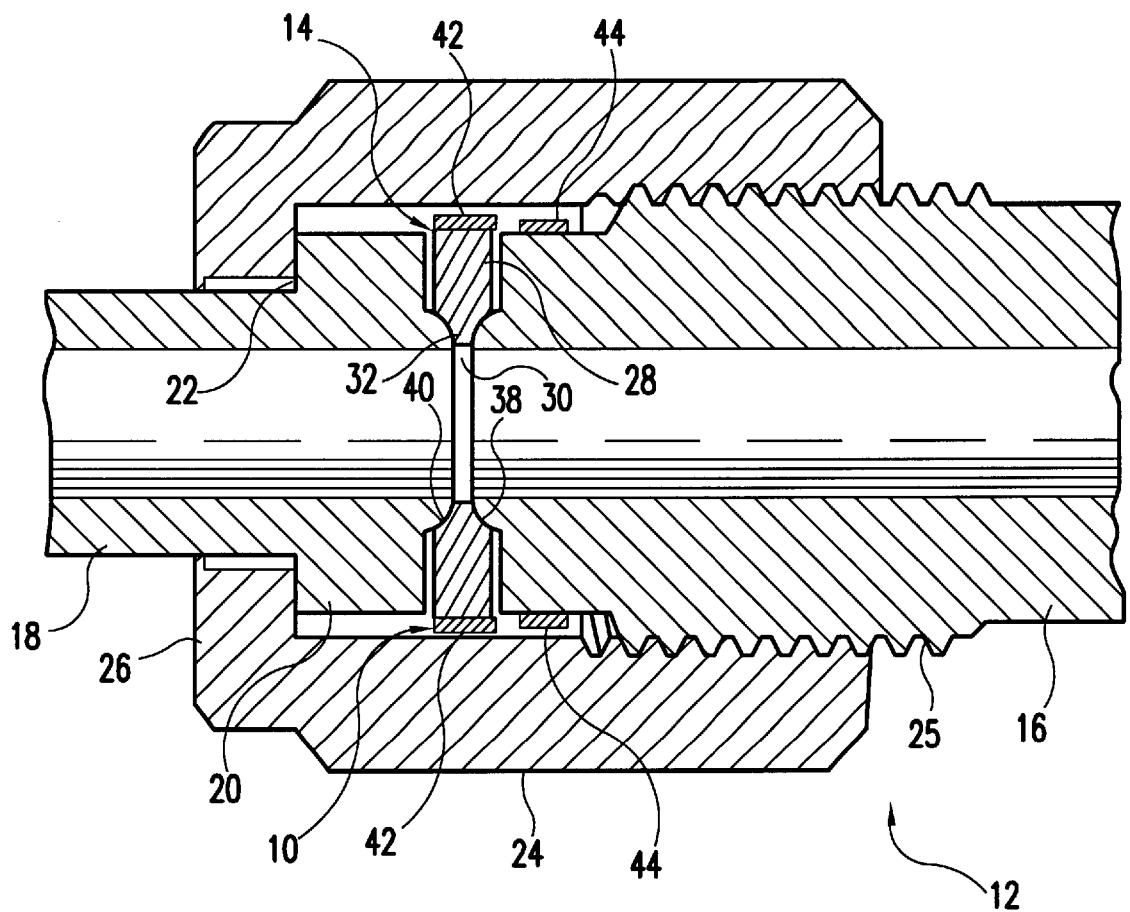
FIG. 1 is a cross-section of a face seal fitting employing a first embodiment of a retainer clip according to the present invention.

As can be appreciated from FIG. 1, the retainer clip according to the present invention, which is designated generally by the reference numeral 10, can be used in connection with a face seal fitting 12 as well as with other fittings comprising coupling components. In the illustrated face seal fitting 12, a gasket 14 is positioned between a first coupling component 16, which is the end of a first tube, and a second coupling component 18, which is the end of a second tube. The second coupling component 18 has a radial flange 20 defining a shoulder 22. A nut 24 threadedly engages a thread 25 on the coupling component 16 and has a radially inwardly directed lip 26 engaging the shoulder 22.

The gasket 14, which is typically made of stainless steel, nickel or other metallic substance, can have various configurations. The illustrated gasket 14 has an outer circular section 28 and a central circular section 30 having a reduced axial dimension. A tapered section 32 between the circular sections 28 and 30 engages sealing noses or beads 38 and 40 defined on the coupling components 16 and 18, respectively. As the nut 26 is screwed onto the thread 25, the nut 22 pulls the annular noses 38 and 40 into engagement with the gasket 14. Prior to the assembly of the face seal fitting 12, the retainer clip 10 holds the gasket 14 onto one of the coupling components, for example, the coupling component 16, so that the gasket will be properly positioned when the two coupling components 16 and 18 are brought together and the fitting 12 is tightened. The retainer clip 10 has a first resilient annular member 42 securing the gasket 14 to the retainer clip 10, a second resilient annular member 44 securing the retainer clip to the coupling component 16, and a bridge (not shown) that connects the first and second resilient annular members 42 and 44. It can be appreciated that as the outer diameter of the gasket 14 increases upon the tightening of the face seal fitting 12, the increased outer diameter is accommodated by an increase in diameter of the first resilient annular member 42 without an increase in diameter of the second resilient annular member 44. As a result, when the fitting 12 is later disassembled, and the gasket 14 retains its expanded outer diameter, the second resilient annular member 44 continues to clampingly engage the first coupling component 16. The bridge and other details of the retainer clip 10 will be better understood from the following description of the embodiments of FIGS. 2–5. The retainer clip 10 and the retainer clip 50 of FIGS. 2–5 differ only in the presence of strengthening ribs on the first and second resilient annular members and the bridge in the retainer clip 50.

As can be seen from FIGS. 2–5, the retainer clip 50 includes a first resilient annular member 52 having first and second circumferential ends 53 and 54 and a discontinuity 55 between the ends. The first resilient annular member 52 has a circumferential extent of almost an entire circle, typically at least 315°. The first resilient annular member 52 has an inner diameter sized to frictionally clamp around or otherwise hold the gasket 14. The retainer clip 50 also includes a second resilient annular member 56 that has an inner diameter dimensioned such that the second annular member frictionally fixes itself to the outer diameter of the coupling component 16 around which the first annular member extends. The second resilient annular member 56 has a circumferential extent of approximately two-thirds of a circle. A bridge 58 connects the first and second resilient annular members 52 and 56 to one another and maintains the annular members coaxial with one another and spaced from one another in the axial direction. The bridge 58 extends from an end of the first resilient annular member 52 to an end of the second resilient annular member 56. From the bridge 58, the first resilient annular member 52 extends in a first circumferential direction, and the second resilient annular member 56 extends in the opposite circumferential direction. The bridge 58 has a circumferential extent, with respect to the circumference of the first and second resilient annular members 52 and 56, of less than 45°.

The resilience of the second annular member 56 is sufficient to enable the gap 60 between the adjacent ends 58 and 59 to be widened sufficiently to allow the retainer clip 50 and a gasket 14 to be inserted between the coupling components 16 and 18 from the side, that is, radially with respect to the coupling components, while the gasket is substantially perpendicular to the longitudinal axis of the coupling components. The elasticity of the second resilient member 56 is sufficient to enable the second resilient member to return to an unwidened condition in which it clamps onto the first coupling component 16.

Each of the first and second resilient annular members 52 and 56 has a circumferentially extending strengthening rib 62, 63, respectively. In the illustrated embodiment, the strengthening ribs 62 and 63 comprise embossed portions of their respective members, the embossed portions protruding radially outward. The bridge has an axially extending strengthening rib 64 similar to the strengthening ribs 62 and 63 of the first and second resilient annular members 52 and 56. Each resilient annular member 52 and 56 is made of a spring steel, preferably, stainless steel.

Figure 6:
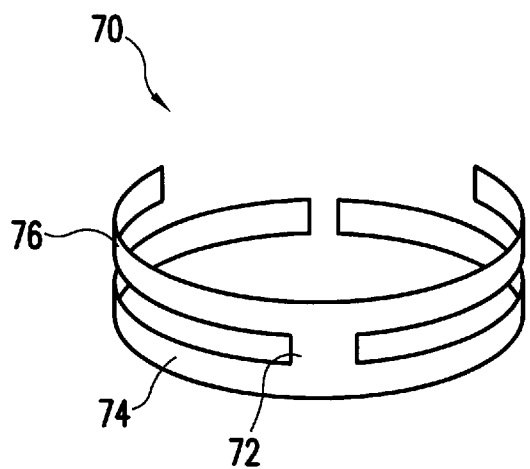
FIG. 6 is a perspective view taken from the front and right side of a third embodiment of retainer clip according to the present invention.
Figure 2:
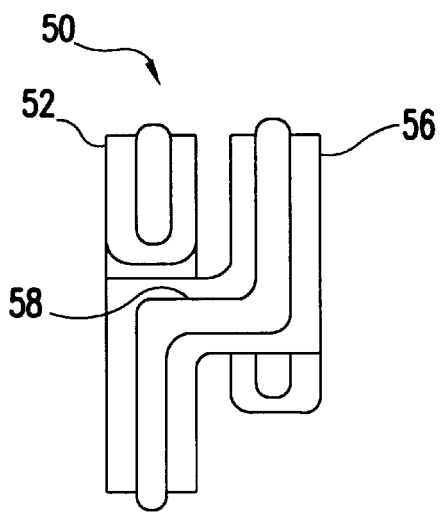
FIG. 2 is a front elevation of a second embodiment of retainer clip according to the present invention.
Figure 3:
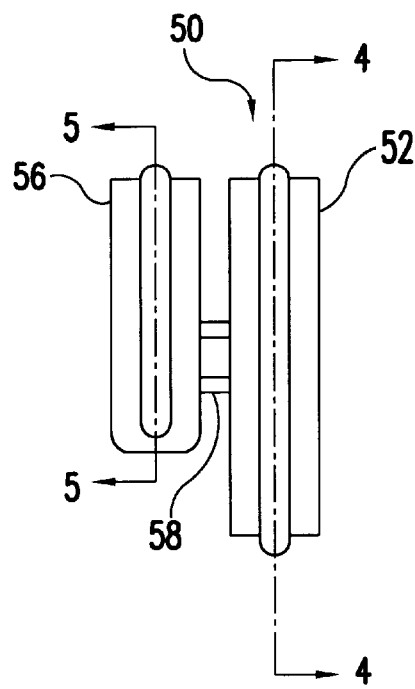
FIG. 3 is a rear elevation of the retainer clip of FIG. 2.
Figure 4:
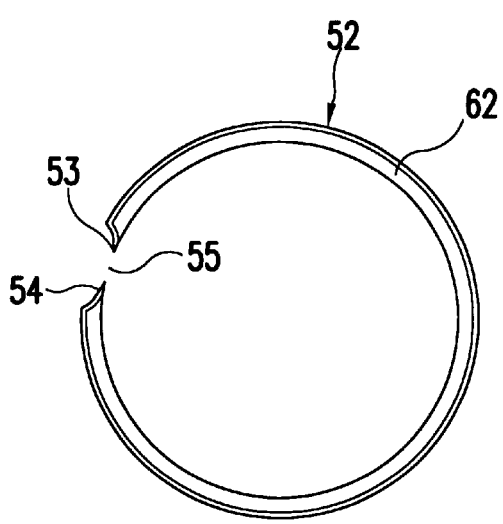
FIG. 4 is a cross-section taken along the line 4—4 in FIG. 3 showing a resilient annular member for clamping around a gasket in a face seal fitting.
Figure 5:
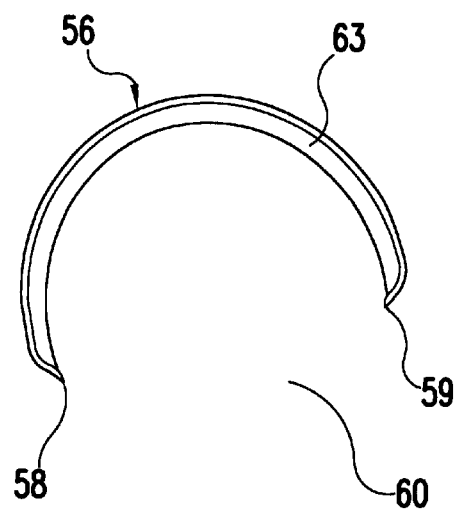
FIG. 5 is a cross-section taken along the line 5—5 in FIG. 3 showing a resilient annular member for clamping around one coupling component in a face seal fitting.

As can be seen from FIG. 6, the retainer clip according to the present invention can take other forms. In the embodiment illustrated in FIG. 6, the retainer clip 70 has a bridge 72 extending from approximately midway between the ends of a first resilient annular member 74 to approximately midway between the ends of a second resilient annular member 76. In all other respects, the retainer clip illustrated in FIG. 6 is the same as the retainer clips of the embodiments of FIGS. 1 and 2–5. Furthermore, the first and second resilient members 74 and 76 and the bridge 72 of the retainer clip can all be made with strengthening ribs like the ribs 62, 63 and 64 of the embodiment of FIGS. 2–5. Where the retainer clip 70 is made of stainless steel, it has been found that a thickness of about 0.016 inches for the first and second resilient annular members 74 and 76 works suitably. A thickness of 0.012 inches has been found to be too thin.

It will be apparent to those skilled in the art and it is contemplated that variations and/or changes in the embodiments illustrated and described herein may be made without departure from the present invention. For example, both the first and second resilient annular members can be made with the smaller circumferential extent, for example, about two-thirds of a circle. As another example, the first resilient annular member can be made with the smaller circumferential extent and the second resilient member with the larger circumferential extent. Accordingly, it is intended that the foregoing description is illustrative only, not limiting, and that the true spirit and scope of the present invention will be determined by the appended claims.

What is claimed is:

1. A retainer clip for holding a gasket between the ends of two coupling components in a face seal fitting, comprising:

a first resilient annular member having first and second circumferential ends and a gap between said ends, the first resilient annular member being sized to retain the gasket;

a second resilient annular member having first and second circumferential ends and a discontinuity between said ends, the second resilient annular member being sized to fix itself by its resilience to one of the coupling components; and a bridge connecting the first and second resilient annular members to one another and maintaining the first and second resilient annular members coaxial with one another, said bridge having an axially extending strengthening rib and a circumferential extent, with respect to the first and second resilient annular members, of less than 90°.

2. The retainer clip of claim 1, wherein the bridge has a circumferential extent of less than 45°.

3. The retainer clip of claim 1, wherein the resilience of the first resilient annular member is sufficient to enable said gap to be widened sufficiently to allow the retainer clip and the gasket to be moved radially between the coupling components while the gasket is substantially perpendicular to the longitudinal axis of the coupling components, and said resilience is sufficient to enable the second resilient member to return to an unwidened condition fix itself to one of the coupling components.

4. The retainer clip of claim 1, wherein the first resilient annular member has a circumferential extent of approximately two-thirds of a circle.

5. The retainer clip of claim 1, wherein the bridge maintains the first and second resilient annular members spaced axially from one another.

6. The retainer clip of claim 1, wherein each of the first and second resilient annular members has a circumferentially extending strengthening rib.

7. The retainer clip of claim 1, wherein the bridge extends from one of the ends of the first resilient annular member to one of the ends of the second resilient annular member.

8. The retainer clip of claim 1, wherein the bridge extends from approximately midway between the ends of the first resilient annular member to approximately midway between the ends of the second resilient annular member.

9. The retainer clip of claim 1, wherein each of the resilient annular members is made of spring steel.

10. In combination, a gasket, a first coupling component in a face seal fitting, and a retainer clip for holding the gasket between an end of the first coupling component and the end of another coupling component in the face seal fitting, wherein the retainer clip comprises:

a first resilient annular member having first and second circumferential ends and a discontinuity between said ends, the first resilient annular member retaining the gasket;

a second resilient annular member having first and second circumferential ends and a gap between said ends, the second resilient annular member fixed by its resilience to said first coupling component; and a bridge connecting the first and second resilient annular members to one another and maintaining the first and second resilient annular members coaxial with one another, said bridge member having a circumferential extent, with respect to the first and second resilient annular members, of less than 90°.

11. The combination of claim 10, wherein the bridge has a circumferential extent of less than 45°.

12. The combination of claim 10, wherein the resilience of the first resilient annular member is sufficient to enable said gap to be widened sufficiently to allow the retainer clip and the gasket to be moved radially between the coupling components while the gasket is substantially perpendicular to the longitudinal axis of the coupling components, and said resilience is sufficient to enable the second resilient member to return to an unwidened condition to fix itself to one of the coupling components.

13. The combination of claim 10, wherein the first resilient annular member has a circumferential extent of approximately two-thirds of a circle.

14. The combination of claim 10, wherein the bridge maintains the first and second resilient annular members spaced axially from one another.

15. The combination of claim 10, wherein each of the first and second resilient annular members has a circumferentially extending strengthening rib.

16. The combination of claim 10, wherein the bridge has an axially extending strengthening rib.

17. The combination of claim 10, wherein the bridge extends from one of the ends of the first resilient annular member to one of the ends of the second resilient annular member.

18. The combination of claim 10, wherein the bridge extends from approximately midway between the ends of the first resilient annular member to approximately midway between the ends of the second resilient annular member.

19. The combination of claim 10 wherein each of the resilient annular members is made of spring steel.

20. A retainer clip for holding a gasket between the ends of two coupling components in a face seal fitting, comprising:

a first resilient annular member having first and second circumferential ends and a gap between said ends, the first resilient annular member being sized to retain the gasket;

a second resilient annular member having first and second circumferential ends and a discontinuity between said ends, the second resilient annular member being sized to fix itself by its resilience to one of the coupling components; and a bridge connecting the first and second resilient annular members to one another and maintaining the first and second resilient annular members coaxial with one another, said bridge having a circumferential extent, with respect to the first and second resilient annular members, of less than 90°, wherein each of the first and second resilient annular members has a circumferentially extending strengthening rib.

* * * * *